J. MASON.
Steam-Radiator.
No. 161,804. Patented April 6, 1875.
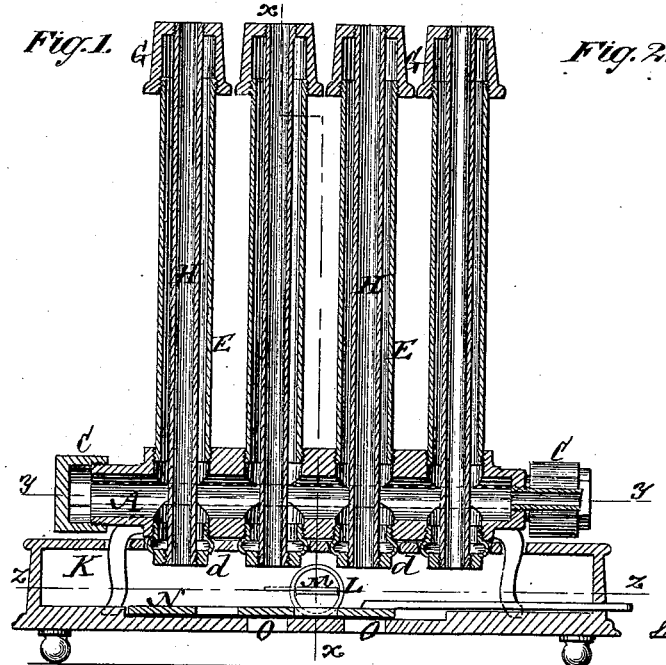
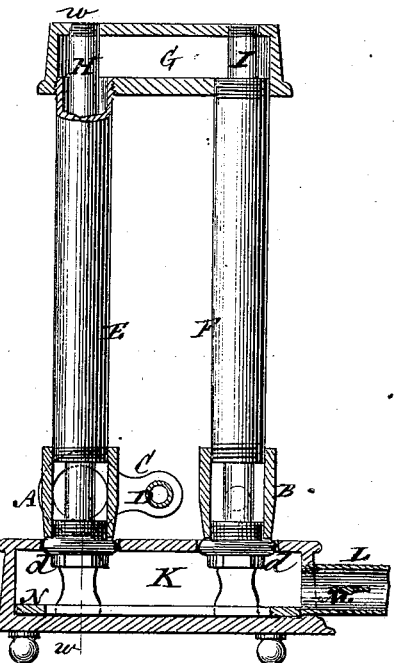
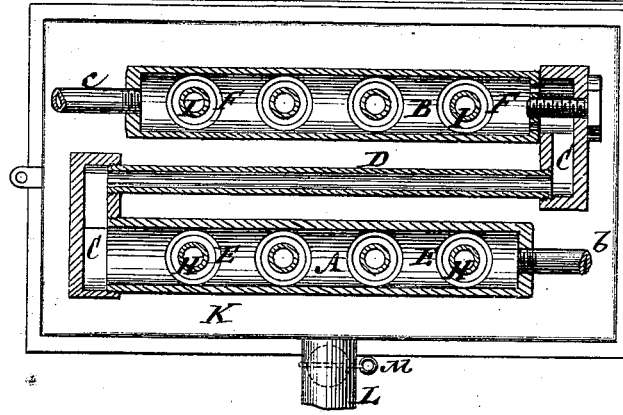
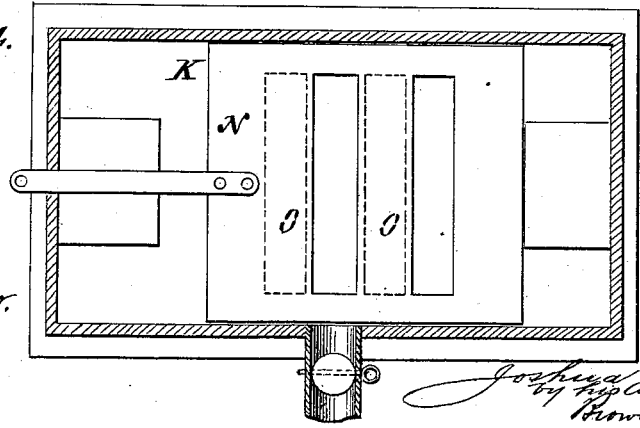

UNITED STATES PATENT OFFICE.

JOSHUA MASON, OF PATERSON, NEW JERSEY.

IMPROVEMENT IN STEAM-RADIATORS.

Specification forming part of Letters Patent No. 161,804, dated April 6, 1875; application filed January 12, 1875.

*To all whom it may concern:*

Be it known that I, JOSHUA MASON, of Paterson, in the county of Passaic and State of New Jersey, have invented certain new and useful Improvements in Radiators for Heating Apartments, and other purposes; and I do hereby declare that the following is a full, clear, and exact description of the same, reference being had to the accompanying drawing, forming part of this specification.

This invention more particularly relates to steam-radiators for heating apartments, and in which the air is not only heated by coming in contact with the exterior surfaces of steam or other heating tubes, but also and more effectively by its passage up and through open-ended or free and independent inner tubes, substantially in effect as described in Letters Patent issued to me August 4, 1874, but with the inner and outer tubes differently arranged in relation to the base.

The invention consists in a novel construction and combination of parts in a steam-radiator, composed of two or more rows of tubes, whereby effectual provision is made for drainage of water of condensation and for the expansion or contraction of the several rows of tubes free from steam.

In the accompanying drawing, Figure 1 represents a longitudinal vertical section on the line *w w* of a steam-radiator constructed in accordance with my invention; Fig. 2, a transverse vertical section of the same, on the irregular line *x x*; Fig. 3, a horizontal section on the line *y y*, and Fig. 4 a horizontal section on the line *z z*.

A is a lower approximately-horizontal steam-pipe, to which steam is admitted at its one end *b*. B is a similar pipe, in parallel relation, or thereabout, with the pipe A, and having an outlet, *c*, for water of condensation. These pipes A and B are in communication, by hollow arms C C at reverse ends of the radiator, and a connecting-pipe, D, to carry off water of condensation. Mounted on the horizontal steam-pipe A are a series of vertical steam-tubes, E, which are connected, by upper hollow connections G, with a series of vertical steam-tubes, F, mounted on the horizontal steam-pipe B. H and I are free or open-ended air pipes or tubes passed vertically up through the pipes A B, the tubes E F, and the upper hollow connections G. These air-pipes H I are secured below to the steam-pipes A B by hollow corrugated nuts D, to provide for expansion.

Steam, entering at *b*, passes along the horizontal pipe A, up the vertical tubes E, and along the hollow upper connections G, down the vertical tubes F, and along the horizontal pipe B to the outlet *c*.

The water of condensation, collecting in the pipe A from the first row of tubes E, passes, by the connecting-pipe D and the hollow arms C C, to the pipe B, and from thence, together with any water of condensation collecting in the pipe B, through the outlet *c*. K is an air-supply box or base, on or within which the tubular radiator freely rests, with freedom to expand or contract, and, owing to the connection, as described, of the lower horizontal pipes A B, by the hollow arms or connections C C, at reverse ends of the radiator and connecting-pipe D, in combination with the upper hollow connections G, strain, as produced by unequal expansion or contraction of the inlet and outlet vertical tubes relatively to each other, is prevented from breaking the joints or otherwise damaging the structure. The air-pipes I and J are in free communication with the air-supply base K, below. Air is admitted to said base either through an inlet, L, controlled by a valve, M, when it is desired to circulate air through the pipes H I, more particularly for the purpose of ventilating the apartment, said inlet L drawing its supply from the atmosphere outside of the building; or air to circulate through the pipes H I may be admitted direct from the apartment, near the floor thereof, by means of perforated slide or other valve N controlling one or more ports, O, in the base K.

A serviceable use of such variable air-supply will be found when first turning on the steam, or in the early use of the radiator of a morning, before the apartment is heated. It then will be advisable to close the valve M of the inlet L, and to open the valve N, until the whole air in the room is fairly heated, after which the valve N may be closed, and cold fresh air from the outside admitted by opening the valve M, to ventilate the room as well as heat it.

I claim—

The combination, with two or more rows of steam-tubes, E F, their base-pipes A B, and the hollow connections G, of the hollow arms C C at reverse ends of the radiator, and the connecting-pipe D, substantially as and for the purposes herein set forth.

JOSHUA MASON.

Witnesses:
M. I. QUIN,
JOHN B. MASON.